US008598982B2

(12) United States Patent
Bhandari et al.

(10) Patent No.: US 8,598,982 B2
(45) Date of Patent: Dec. 3, 2013

(54) SYSTEMS AND METHODS FOR COMMISSIONING ACCESS CONTROL DEVICES

(75) Inventors: Neelendra Bhandari, Barmer (IN); Priteshkumar D Joshi, Dhoraji (IN); Chandrakanth C Reddy, Kurnool (IN); Parveen Kumar Goel, New South Wales (AU)

(73) Assignee: Honeywell International Inc., Morristown, NJ (US)

( * ) Notice: Subject to any disclaimer, the term of this patent is extended or adjusted under 35 U.S.C. 154(b) by 868 days.

(21) Appl. No.: 12/601,610

(22) PCT Filed: May 21, 2008 (Under 37 CFR 1.47)

(86) PCT No.: PCT/AU2008/000717
§ 371 (c)(1),
(2), (4) Date: May 19, 2010

(87) PCT Pub. No.: WO2008/144804
PCT Pub. Date: Dec. 4, 2008

(65) Prior Publication Data
US 2011/0115602 A1    May 19, 2011

(30) Foreign Application Priority Data
May 28, 2007   (AU) ............................... 2007903453

(51) Int. Cl.
*G05B 19/00*   (2006.01)
(52) U.S. Cl.
USPC ......... 340/5.6; 340/5.22; 340/5.23; 340/5.61; 340/5.64

(58) Field of Classification Search
USPC ........ 340/5.1, 5.2, 5.21, 5.22, 5.23, 5.24, 5.6, 340/5.64, 5.67, 5.26, 10.1, 10.2, 10.3, 10.4, 340/572.1, 539.13, 539.21, 539.23
See application file for complete search history.

(56) References Cited

U.S. PATENT DOCUMENTS

| | | | |
|---|---|---|---|
| 3,753,232 A | 8/1973 | Sporer | |
| 3,806,911 A | 4/1974 | Pripusich | |
| 3,857,018 A | 12/1974 | Stark et al. | |

(Continued)

FOREIGN PATENT DOCUMENTS

| | | |
|---|---|---|
| CA | 2240881 | 12/1999 |
| CN | 1265762 A | 9/2000 |

(Continued)

OTHER PUBLICATIONS

"Certificate Validation Choices," CoreStreet, Inc., 8 pages, 2002.

(Continued)

*Primary Examiner* — Nabil Syed
(74) *Attorney, Agent, or Firm* — Seager Tufte Wickhem LLC.

(57) ABSTRACT

Described herein are systems and methods for commissioning access control devices. In overview, a carrier substrate such as a smartcard is used to commission a plurality of access control devices. Measures are implemented such that the individual access control devices are uniquely commissioned. That is, no two devices apply identical commissioning data, hi some embodiments this is achieved by, as part of the commissioning process at a given access control device, modifying one or more aspects of the data carried by the carrier substrate.

20 Claims, 10 Drawing Sheets

(56) References Cited

U.S. PATENT DOCUMENTS

| | | |
|---|---|---|
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A * | 1/1997 | Nakahara ............... 340/5.26 |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,778,256 A | 7/1998 | Darbee |
| 5,793,868 A | 8/1998 | Micali |
| 5,914,875 A | 6/1999 | Monta et al. |
| 5,915,473 A | 6/1999 | Ganesh et al. |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagishi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 * | 6/2003 | Reed et al. ............... 340/5.21 |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |

(56) References Cited

U.S. PATENT DOCUMENTS

| | | | |
|---|---|---|---|
| 7,383,158 B2 | 6/2008 | Krocker et al. | |
| 7,397,371 B2 | 7/2008 | Martin et al. | |
| 7,505,914 B2 | 3/2009 | McCall | |
| 7,542,867 B2 | 6/2009 | Steger et al. | |
| 7,574,734 B2 | 8/2009 | Fedronic et al. | |
| 7,586,398 B2 | 9/2009 | Huang et al. | |
| 7,600,679 B2 | 10/2009 | Kshirsagar et al. | |
| 7,661,603 B2 | 2/2010 | Yoon et al. | |
| 7,735,145 B2 | 6/2010 | Kuehnel et al. | |
| 7,796,536 B2 | 9/2010 | Roy et al. | |
| 7,818,026 B2 | 10/2010 | Hartikainen et al. | |
| 7,853,987 B2 | 12/2010 | Balasubramanian et al. | |
| 7,907,753 B2 | 3/2011 | Wilson et al. | |
| 7,937,669 B2 | 5/2011 | Zhang et al. | |
| 7,983,892 B2 | 7/2011 | Anne et al. | |
| 7,995,526 B2 | 8/2011 | Liu et al. | |
| 8,045,960 B2 | 10/2011 | Orakkan | |
| 8,095,889 B2 | 1/2012 | DeBlaey et al. | |
| 2002/0011923 A1 | 1/2002 | Cunningham et al. | |
| 2002/0022991 A1 | 2/2002 | Sharood et al. | |
| 2002/0046337 A1 | 4/2002 | Micali | |
| 2002/0118096 A1 | 8/2002 | Hoyos et al. | |
| 2002/0121961 A1 | 9/2002 | Huff | |
| 2002/0165824 A1 | 11/2002 | Micali | |
| 2003/0033230 A1 | 2/2003 | McCall | |
| 2003/0097586 A1* | 5/2003 | Mok | 713/200 |
| 2003/0174049 A1 | 9/2003 | Beigel et al. | |
| 2003/0208689 A1 | 11/2003 | Garza | |
| 2003/0233432 A1 | 12/2003 | Davis et al. | |
| 2004/0062421 A1 | 4/2004 | Jakubowski et al. | |
| 2004/0064453 A1 | 4/2004 | Ruiz et al. | |
| 2004/0087362 A1 | 5/2004 | Beavers | |
| 2004/0205350 A1 | 10/2004 | Waterhouse et al. | |
| 2005/0138380 A1 | 6/2005 | Fedronic et al. | |
| 2006/0059557 A1 | 3/2006 | Markham et al. | |
| 2007/0109098 A1 | 5/2007 | Siemon et al. | |
| 2007/0132550 A1 | 6/2007 | Avraham et al. | |
| 2007/0171862 A1 | 7/2007 | Tang et al. | |
| 2007/0268145 A1 | 11/2007 | Bazakos et al. | |
| 2007/0272744 A1 | 11/2007 | Bantwal et al. | |
| 2008/0086758 A1 | 4/2008 | Chowdhury et al. | |
| 2008/0173709 A1 | 7/2008 | Ghosh | |
| 2008/0272881 A1 | 11/2008 | Goel | |
| 2009/0018900 A1 | 1/2009 | Waldron et al. | |
| 2009/0058594 A1* | 3/2009 | Nakagawa et al. | 340/5.7 |
| 2009/0080443 A1 | 3/2009 | Dziadosz | |
| 2009/0086692 A1 | 4/2009 | Chen | |
| 2009/0121830 A1 | 5/2009 | Dziadosz | |
| 2009/0167485 A1 | 7/2009 | Birchbauer et al. | |
| 2009/0168695 A1 | 7/2009 | Johar et al. | |
| 2009/0258643 A1 | 10/2009 | McGuffin | |
| 2009/0266885 A1 | 10/2009 | Marcinowski et al. | |
| 2009/0292524 A1 | 11/2009 | Anne et al. | |
| 2009/0292995 A1 | 11/2009 | Anne et al. | |
| 2009/0292996 A1 | 11/2009 | Anne et al. | |
| 2009/0328152 A1 | 12/2009 | Thomas et al. | |
| 2009/0328203 A1 | 12/2009 | Haas | |
| 2010/0036511 A1 | 2/2010 | Dongare | |
| 2010/0148918 A1 | 6/2010 | Gerner et al. | |
| 2010/0164720 A1 | 7/2010 | Kore | |
| 2010/0269173 A1 | 10/2010 | Srinivasa et al. | |
| 2011/0038278 A1 | 2/2011 | Bhandari et al. | |
| 2011/0071929 A1 | 3/2011 | Morrison | |
| 2011/0133884 A1 | 6/2011 | Kumar et al. | |
| 2011/0153791 A1 | 6/2011 | Jones et al. | |
| 2011/0167488 A1 | 7/2011 | Roy et al. | |
| 2011/0181414 A1 | 7/2011 | G et al. | |
| 2012/0096131 A1 | 4/2012 | Bhandari et al. | |
| 2012/0106915 A1 | 5/2012 | Palmer | |
| 2012/0121229 A1 | 5/2012 | Lee | |
| 2012/0133482 A1 | 5/2012 | Bhandari et al. | |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 A1 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | 0076220 A1 | 12/2000 |
| WO | 0142598 A1 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006049181 A1 * | 5/2006 |
| WO | 2006126974 A1 | 11/2006 |
| WO | 2007043798 A1 | 4/2007 |
| WO | 2008045918 A2 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

"CoreStreet Cuts the PKI Gordian Knot," Digital ID World, pp. 22-25, Jun./Jul. 2004.

"Distributed Certificate Validation," CoreStreet, Ltd., 17 pages, 2006.

"Identity Services Infrastructure," CoreStreet Solutions—Whitepaper, 12 pages, 2006.

"Important FIPS 201 Deployment Considerations," Corestreet Ltd.—Whitepaper, 11 pages, 2005.

"Introduction to Validation for Federated PKI," Corestreet Ltd, 20 pages, 2006.

"Manageable Secure Physical Access," Corestreet Ltd, 3 pages, 2002.

"MiniCRL, Corestreet Technology Datasheet," CoreStreet, 1 page, 2006.

"Nonce Sense, Freshness and Security in OCSP Responses," Corestreet Ltd, 2 pages, 2003.

"Real Time Credential Validation, Secure, Efficient Permissions Management," Corestreet Ltd, 5 pages, 2002.

"The Role of Practical Validation for Homeland Security," Corestreet Ltd, 3 pages, 2002.

"The Roles of Authentication, Authorization & Cryptography in Expanding Security Industry Technology," Security Industry Association (SIA), Quarterly Technical Update, 32 pages, Dec. 2005.

"Vulnerability Analysis of Certificate Validation Systems," Corestreet Ltd—Whitepaper, 14 pages, 2006.

U.S. Appl. No. 13/292,992, filed Nov. 9, 2011.

Goldman et al., "Information Modeling for Intrusion Report Aggregation," IEEE, Proceedings DARPA Information Survivability Conference and Exposition II, pp. 329-342, 2001.

http://www.tcsbasys.com/products/superstats.asp, TCS/Basys Controls: Where Buildings Connect With Business, 2 pages, printed Aug. 26, 2003.

http://www.tcsbasys.com/products/sz1009.asp, TCS/Basys Controls: Where Buildings Connect With Business, 1 page, printed Aug. 26, 2003.

http://www.tcsbasys.com/products/sz1017a.asp, TCS/Basys Controls: Where Buildings Connect With Business, 1 page, printed Aug. 26, 2003.

(56) References Cited

OTHER PUBLICATIONS http://www.tcsbasys.com/products/sz1017n.asp, TCS/Basys Controls: Where Buildings Connect With Business, 1 page, printed Aug. 26, 2003.

http://www.tcsbasys.com/products/sz1020nseries.asp, TCS/Basys Controls: Where Buildings Connect With Business, 2 pages, printed Aug. 26, 2003.

http://www.tcsbasys.com/products/sz1020series.asp, TCS/Basys Controls: Where Buildings Connect With Business, 2 pages, printed Aug. 26, 2003.

http://www.tcsbasys.com/products/sz1022.asp, TCS/Basys Controls: Where Buildings Connect With Business, 2 pages, printed Aug. 26, 2003.

http://www.tcsbasys.com/products/sz1024.asp, TCS/Basys Controls: Where Buildings Connect With Business, 2 pages, printed Aug. 26, 2003.

http://www.tcsbasys.com/products/sz1030series.asp, TCS/Basys Controls: Where Buildings Connect With Business, 2 pages, printed Aug. 26, 2003.

http://www.tcsbasys.com/products/sz1033.asp, TCS/Basys Controls: Where Buildings Connect With Business, 2 pages, printed Aug. 26, 2003.

http://www.tcsbasys.com/products/sz1035.asp, TCS/Basys Controls: Where Buildings Connect With Business, 2 pages, printed Aug. 26, 2003.

http://www.tcsbasys.com/products/sz1041.asp, TCS/Basys Controls: Where Buildings Connect With Business, 1 page, printed Aug. 26, 2003.

http://www.tcsbasys.com/products/sz1050series.asp, TCS/Basys Controls: Where Buildings Connect With Business, 2 pages, printed Aug. 26, 2003.

http://www.tcsbasys.com/products/sz1051.asp, TCS/Basys Controls: Where Buildings Connect With Business, 2 pages, printed Aug. 26, 2003.

http://www.tcsbasys.com/products/sz1053.asp, TCS/Basys Controls: Where Buildings Connect With Business, 2 pages, printed Aug. 26, 2003.

http://wwww.tcsbasys.com/products/sz1031.asp, TCS/Basys Controls: Where Buildings Connect With Business, 2 pages, printed Aug. 26, 2003.

"Keyfast Technical Overview," Corestreet Ltd., 21 pages, 2004.

U.S. Appl. No. 13/533,334, filed Jun. 26, 2012.

Honeywell, "Excel Building Supersivor—Integrated R7044 and FS 90 Ver. 2.0", Operator Manual, 70 pages, Apr. 1995.

Trane, "System Programming, Tracer Summit Version 14, BMTW-SVP01D-EN," 623 pages, 2002.

English Translation of Office Action for Chinese Patent Application No. 2008801006277, 10 pages, Application Date May 21, 2008, Date of Issue Jan. 18, 2012.

Honeywell, "Excel Building Supervisor—Integrated R7044 and FS90 Ver. 2.0," Operator Manual, 70 pages, Apr. 1995.

* cited by examiner

SYSTEMS AND METHODS FOR COMMISSIONING ACCESS CONTROL DEVICES

FIELD OF THE INVENTION

The present invention relates to access control, and more particularly to systems and methods for commissioning access control devices. Embodiments of the invention have been particularly developed for commissioning access control devices by way of smartcards, and the present disclosure is primarily focused accordingly. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. Before each individual access control device is able to function as part of the access control environment, those individual devices need to be commissioned.

Commissioning is a process whereby an individual access control device is provided with data indicative of:

The context of the individual device within the larger system. For example, an identifier that is unique with respect to other devices in the system, and/or network information such as an IP address in the case of an IP enabled access control device.
 Other information that allows the device to operate in an access control environment, such as electronic security keys and other authentication information.

There are two main approaches for commissioning access control devices. The first approach relies on the access control devices being connected to a common network. An auto-discovery process is conducted over this network to discover the individual devices, assign unique identifiers, and transmit other commissioning information. This approach is often difficult to implement, particularly where network security constraints affect the ability to conduct an auto-discovery process (which typically necessitates broadcast messaging). There are additional complications where there is no DHCP server available, and practical difficulties in matching electronically discovered devices to physically observable devices. The second approach is to individually serially connect each access control device to a terminal, such as a laptop computer, and manually transmit the commissioning information from the terminal to the device. It will be appreciated that this is a time-consuming process, and impractical where there are a large number of access control devices. Additionally, the process is error prone, and there is a risk that non-unique identifiers could be assigned.

It follows that there is a need in the art for improved systems and methods for commissioning access control devices.

SUMMARY

It is an object of the present invention to overcome or ameliorate at least one of the disadvantages of the prior art, or to provide a useful alternative.

One aspect of the present invention provides a method for commissioning an access control device, the method including the steps of:
 (a) reading commissioning data from a carrier substrate, the commissioning data being applicable to an access control device for commissioning the access control device, the commissioning data including a first unique identifier which is applied to the access control device upon application of the commission data;
 (b) applying the commissioning data to the access control device thereby to commission the access control device;
 (c) defining a second unique identifier on the basis of the first unique device identifier;
 (d) writing the second unique identifier to the carrier substrate in place of the first unique identifier such that a subsequently commissioned access control device commissioned by the carrier substrate control device applies the second unique identifier.

One embodiment provides a computer-readable carrier medium carrying a set of instructions that when executed by one or more processors cause the one or more processors to carry out a method for commissioning an access control device, the method including the steps of:
 (a) reading commissioning data from a carrier substrate, the commissioning data being applicable to an access control device for commissioning the access control device, the commissioning data including a first unique identifier which is applied to the access control device upon application of the commission data;
 (b) applying the commissioning data to the access control device thereby to commission the access control device;
 (c) defining a second unique identifier on the basis of the first unique device identifier;
 (d) writing the second unique identifier to the carrier substrate in place of the first unique identifier such that a subsequently commissioned access control device commissioned by the carrier substrate control device applies the second unique identifier.

One embodiment provides a controller for an access control device, the controller including:
 an input for reading commissioning data from a carrier substrate, the commissioning data being applicable to an access control device for commissioning the access control device, the commissioning data including a first unique identifier which is applied to the access control device upon application of the commission data;
 a processor for:
 (i) applying the commissioning data to the access control device thereby to commission the access control device;
 (ii) defining a second unique identifier on the basis of the first unique device identifier;
 an output for writing the second unique identifier to the carrier substrate in place of the first unique identifier such that a subsequently commissioned access control device commissioned by the carrier substrate control device applies the second unique identifier.

One embodiment provides a access control device including:
 an input for reading commissioning data from a carrier substrate, the commissioning data being applicable to an access control device for commissioning the access control device, the commissioning data including a first unique identifier which is applied to the access control device upon application of the commission data;
 a processor for:
 (i) applying the commissioning data to the access control device thereby to commission the access control device;

(ii) defining a second unique identifier on the basis of the first unique device identifier;

an output for writing the second unique identifier to the carrier substrate in place of the first unique identifier such that a subsequently commissioned access control device commissioned by the carrier substrate control device applies the second unique identifier.

One embodiment provides a method for commissioning a plurality of access control devices, the method including the steps of:

(a) receiving commissioning data, the commissioning data being applicable to an access control device for commissioning the access control device, the commissioning data including a first unique identifier which is applied to the access control device upon application of the commission data;

(b) providing a signal indicative of an instruction to write the commissioning data to a carrier substrate.

One embodiment provides a method wherein the carrier substrate is a smartcard.

One embodiment provides a method wherein the smartcard is readable in substantially the same manner as an access control card configured for use with the access control device.

One embodiment provides a method wherein the commissioning data includes a legacy identifier indicative of a number of access control devices are to be commissioned by the carrier substrate.

One embodiment provides a method wherein the commissioning information includes a first IP address.

One embodiment provides a method wherein the commissioning data is received at an administration terminal by way of a user interface.

One embodiment provides a method wherein the signal is provided to an access control device.

One embodiment provides a method wherein the commissioning data is received at an access control device by way of a connection with an administration terminal.

One embodiment provides a method wherein the signal is provided to a reader/writer module complementary to the carrier substrate.

One embodiment provides a computer-readable carrier medium carrying a set of instructions that when executed by one or more processors cause the one or more processors to carry out a method for commissioning an access control device, the method including the steps of:

(a) receiving commissioning data, the commissioning data being applicable to an access control device for commissioning the access control device, the commissioning data including a first unique identifier which is applied to the access control device upon application of the commission data;

(b) providing a signal indicative of an instruction to write the commissioning data to a carrier substrate.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for commissioning access control devices. In overview, a carrier substrate such as a smartcard is used to commission a plurality of access control devices. Measures are implemented such that the individual access control devices are uniquely commissioned. That is, no two devices apply identical commissioning data. In some embodiments this is achieved by, as part of the commissioning process at a given access control device, modifying one or more aspects of the data carried by the carrier substrate.

Figure 1:
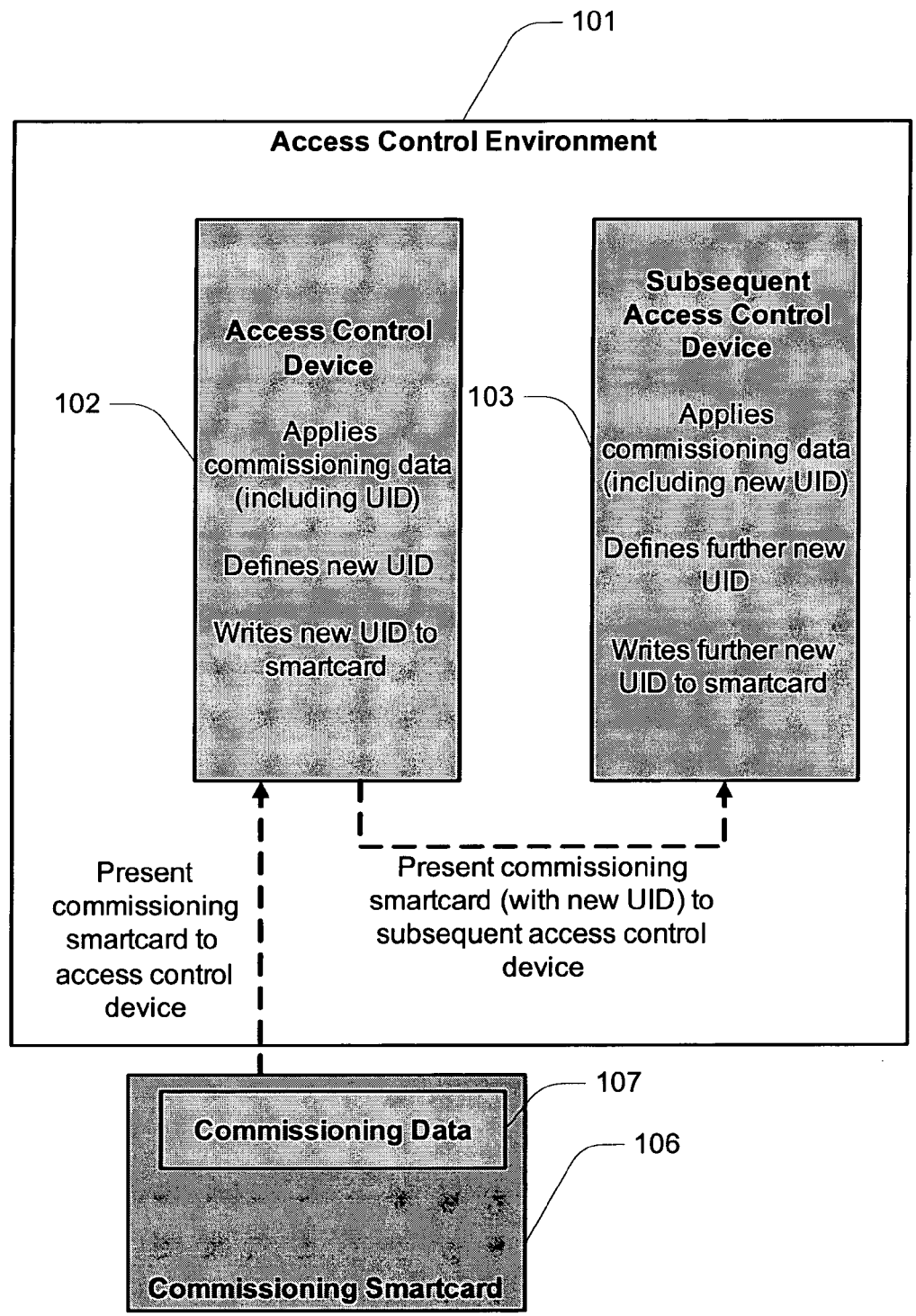
FIG. 1 schematically illustrates an access control environment according to one embodiment.

FIG. 1 schematically illustrates an access control environment 101 including uncommissioned access control devices 102 and 103. A user presents a carrier substrate, in the form of a smartcard 106, to access control devices 102 and 103 individually. Smartcard 106 carries commissioning data 107. This commissioning data is applicable to an access control device (such as either of devices 102 and 103) for commissioning that access control device. In particular, each of devices 102 and 103 is configured for being responsive to the presentation of smartcard 106 for applying commissioning data 107 thereby to bring itself into commission.

In overview, a user initially presents smartcard 106 to access control device 102. Device 102 applies commissioning data 107 to bring itself into commission. The application of data 107 includes the application of a unique identifier (UID) maintained by data 107. Device 102, as part of the commissioning process, defines a new UID, and writes that new unique identifier to smartcard 106 in place of the UID applied to device 102. The new UID is, in some embodiments, defined on the basis of one or more constraints set in the process of creating the commissioning smartcard.

Smartcard 106 is then presented to a subsequent access control device, in the present example being device 103. Device 103 then undertakes a similar commissioning process, which includes adopting the new UID, defining a further new UID, and writing the further new UID to smartcard 106. The user then presents smartcard 106 to a subsequent access control device, and the process continues so that each access control device commissioned by way of card 106 applies a UID, this UID being unique in the context of all those access control devices.

The term "access control device" refers generally to any device having an access control functionality. That is, any device with which a user interacts to gain access to a physical region or virtual functionality. Common examples include devices that control locking mechanisms on doors or other barriers. However, access control devices are also used for providing access to functionalities, such as lighting in a room. An access control device includes either or both of hardware and software components.

The term carrier substrate should be read broadly to include any media capable of carrying digital information that is able to be read, modified or deleted. The term smartcard is used to describe a carrier substrate in card form. Smartcards carry digital information in a variety of ways, including by way of flash memory, magnetic strips, RFID chips, and the like.

The term "commissioning data" refers to data used for the commissioning of an access control device. Commissioning data is applicable (able to be applied) to an access control device to commission that device (progress the device from an uncommissioned state to a commissioned state). "Commissioning" is a process whereby an access control device is provided with and applies one or more aspects of data such that the device is able to function in the context of a wider access control environment including a plurality of distributed (and optionally networked) access control devices. The aspects of data include one or more of:

A site-specific UID. This allows identification of a given device in the context of an access control environment.

Network information, such as an IP address, a subnet mask, default gateway and/or encryption keys.

Security information, for example information that allows secure communications between the device and other components on the network.

Other commissioning information. Examples include default configuration data for the device, substantially any information that is to be constant or vary predictably across all devices in a given environment (such as organization details), or any unique parameters that are assignable based on a rule.

Figure 2:
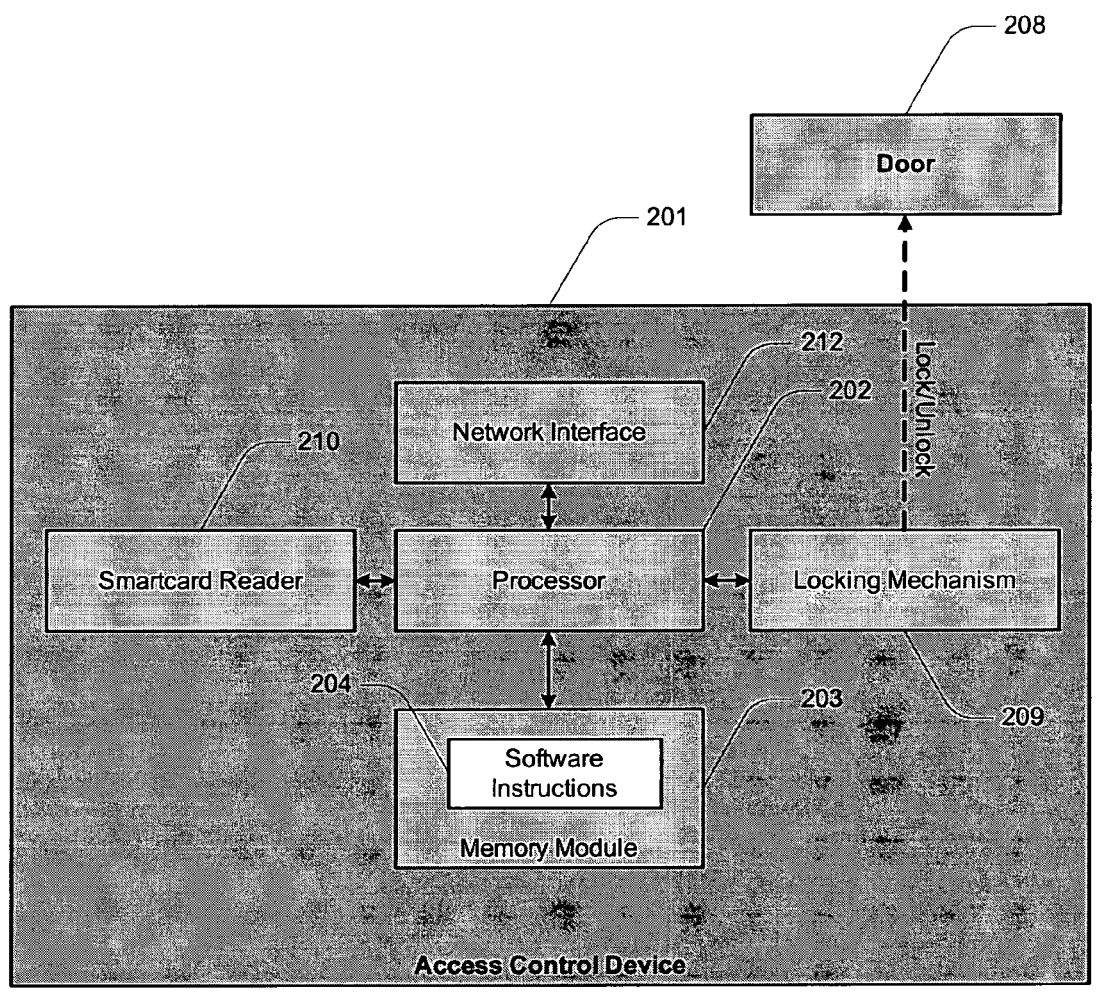
FIG. 2 schematically illustrates an access control device according to one embodiment.

FIG. 2 illustrates an exemplary access control device 201 according to one embodiment. Device 201 is configured for integration into an access control environment such as environment 101 of FIG. 1.

Device 201 includes a processor 202 coupled to a memory module 203. Memory module 203 carries software instructions 204 which, when executed on processor 202, allow device 201 to perform various methods and functionalities described herein.

In the present example, device 201 is configured for selectively granting access through a door 208. In particular, processor 201 is coupled to a locking mechanism 209 which, when in a locked state, prevents access through door 208, and when in an unlocked state, permits access through door 208. The locked state is default. A user wishing to gain access through door 208 presents an access card to a card reader 210, which is also coupled to processor 201. Upon presentation of an access card, processor 201 performs an authentication process to determine whether or not access should be granted. In the event that the authentication process is successful, mechanism 209 is progressed to the unlocked state for a predefined period of time, typically the order of a few seconds, before returning to the locked state. If the authentication process is unsuccessful, mechanism 209 remains in the locked state, and access is denied.

Figure 2A:
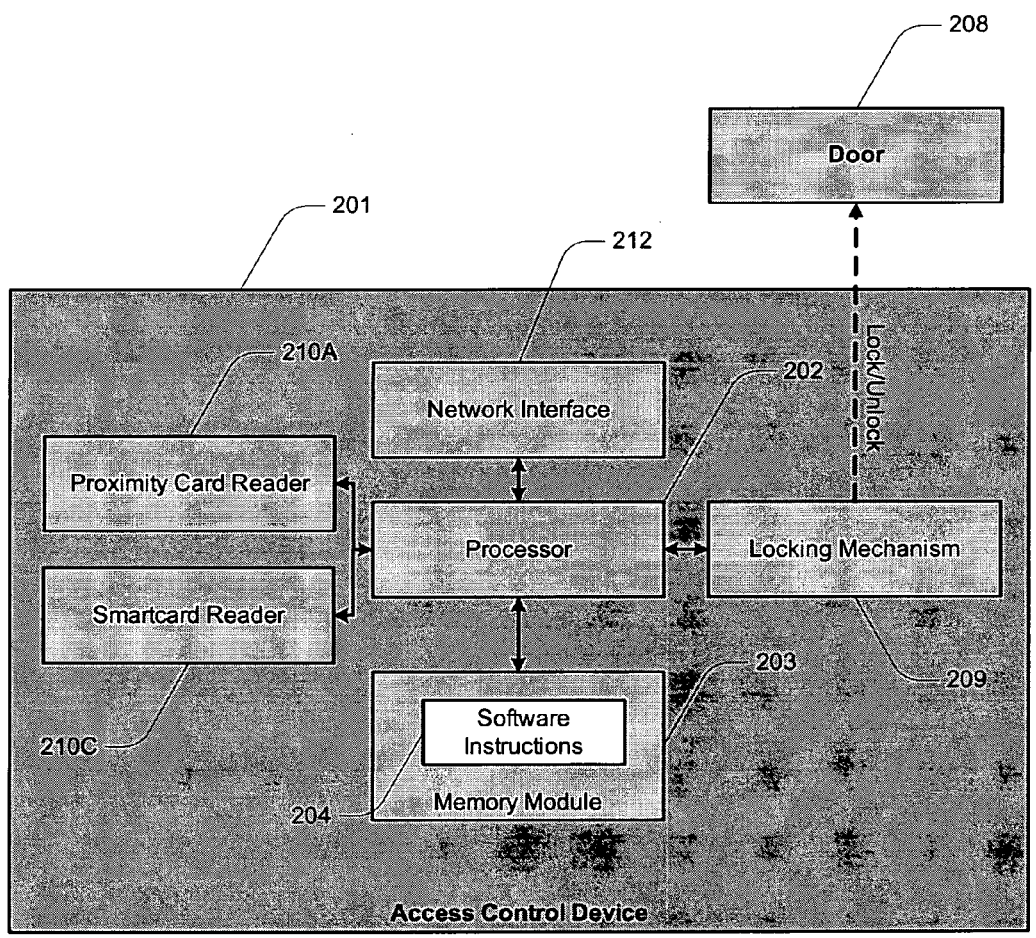
FIG. 2A schematically illustrates an access control device according to one embodiment.

The nature of card reader present varies between embodiments depending on the nature of access card that is used in a given access control environment. In the embodiment of FIG. 2, access cards are in the form of smartcards, and reader 210 is a smartcard reader. That is, a commissioning smartcard is readable in substantially the same manner as an access control card configured for use with the access control device. However, in the alternate embodiment of FIG. 2A, access card are in the form of proximity cards, and a proximity card reader 210A is provided. In that case, a smartcard reader 210C is also provided for allowing smartcard-based commissioning functionalities described herein. In further embodiments access codes are used rather than access cards, in which case the reader includes an interface for entering an access code. In some embodiments a combination of these approaches are used.

In the present embodiment, device includes a network interface 212 (such as a Ethernet or other wired/wireless network interface) coupled to processor 202 for allowing device 201 to communicate over a network. In the present embodiment device 201 is configured for operation in either a connected state (with connection to the network) or a disconnected state (without connection to the network).

Figure 3:
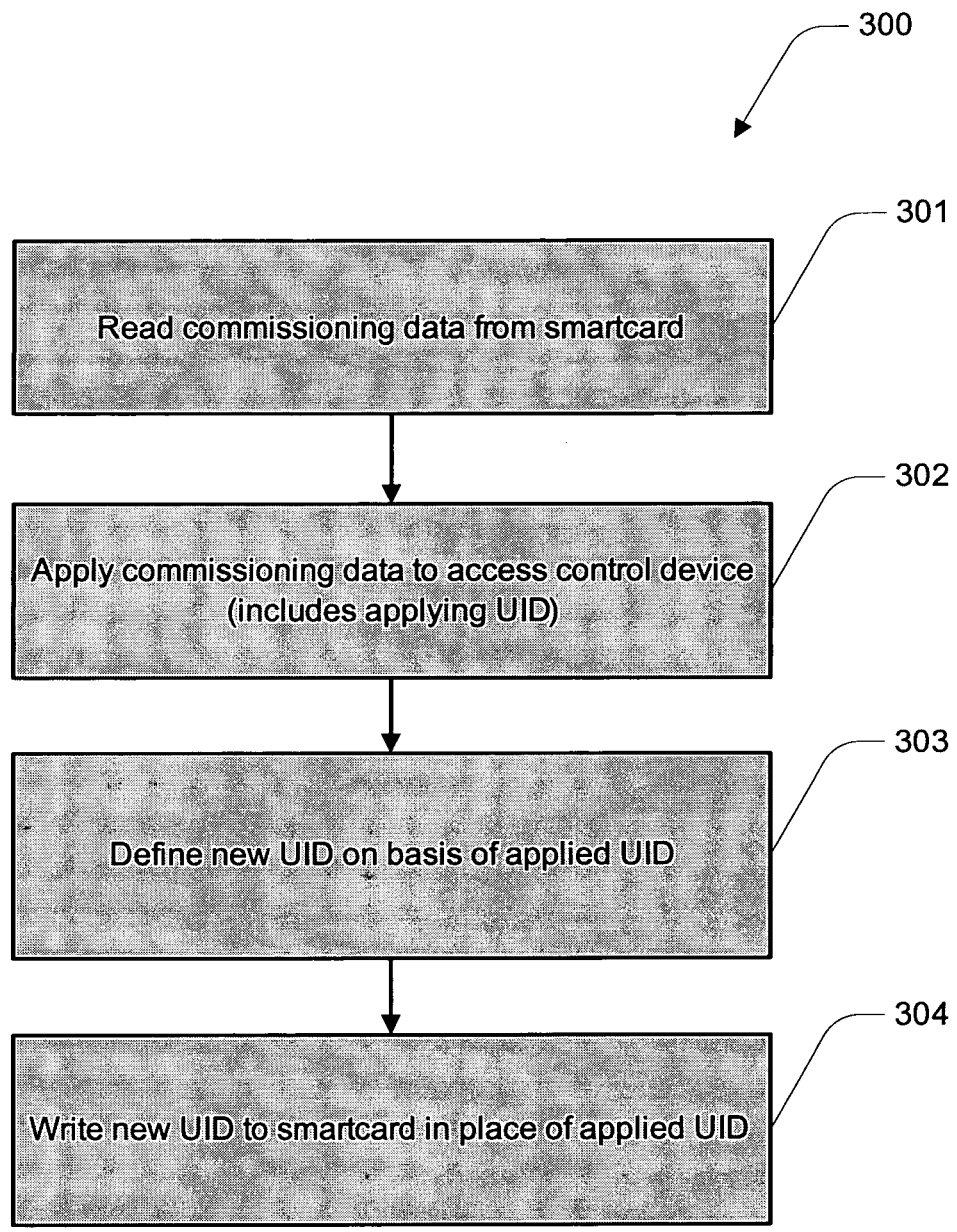
FIG. 3 schematically illustrates a method according to one embodiment.

FIG. 3 illustrates a method 300 according to one embodiment. Method 300 is performable by device 201 upon the presentation of a smartcard carrying commissioning data. This commissioning data is applicable to an access control device such as device 201 for commissioning that device. The commissioning data includes a site-specific UID which is applied to the access control device upon application of the commissioning data. Each commissioned device has applied to it site-specific UID, which allows unique identification of that device in the context of an access control environment.

In alternate embodiments, method 300 is performed by a controller coupled to an access control device, as opposed at an access control device itself.

Step 301 includes reading commissioning data from the smartcard. That is processor 202 reads data maintained on the smartcard by way of reader 210.

Step 302 includes applying the commissioning data to the access control device thereby to commission the access control device. In particular, processor 202 assesses the commissioning data to determine whether or not it meets predefined requirements for application and, assuming those requirements are met, writes the data in an appropriate fashion to memory module 203. For example, memory module 203 includes a configuration file for maintaining aspects of the commissioning data, and the relevant aspects of data are written to relevant locations in the configuration file.

Step 303 includes defining a new UID on the basis of the existing UID. In the present embodiment this is achieved by incrementing the existing UID by a predefined amount. For example, where the UID includes a numerical portion, the incrementing includes varying the numerical value by a predefined amount, or based on limits defined in the process of creating the commissioning card. Other techniques for implementing step 303 are applied in alternate embodiments.

Step 304 includes writing UID defined at step 303 to the smartcard in place the previous UID. That is, processor 202 provides to reader 201 data indicative of the new UID and instructions to write that UID to the smartcard. In some embodiments step 304 includes replacing the existing UID with the new UID, whereas in other embodiments step 304 includes replacing a larger portion of the commissioning data (or all of the commissioning data) to achieve a similar result.

It will be appreciated that, following step 304, if the smartcard in question is provided to a subsequent access control device, that device applies the new UID.

Figure 3A:
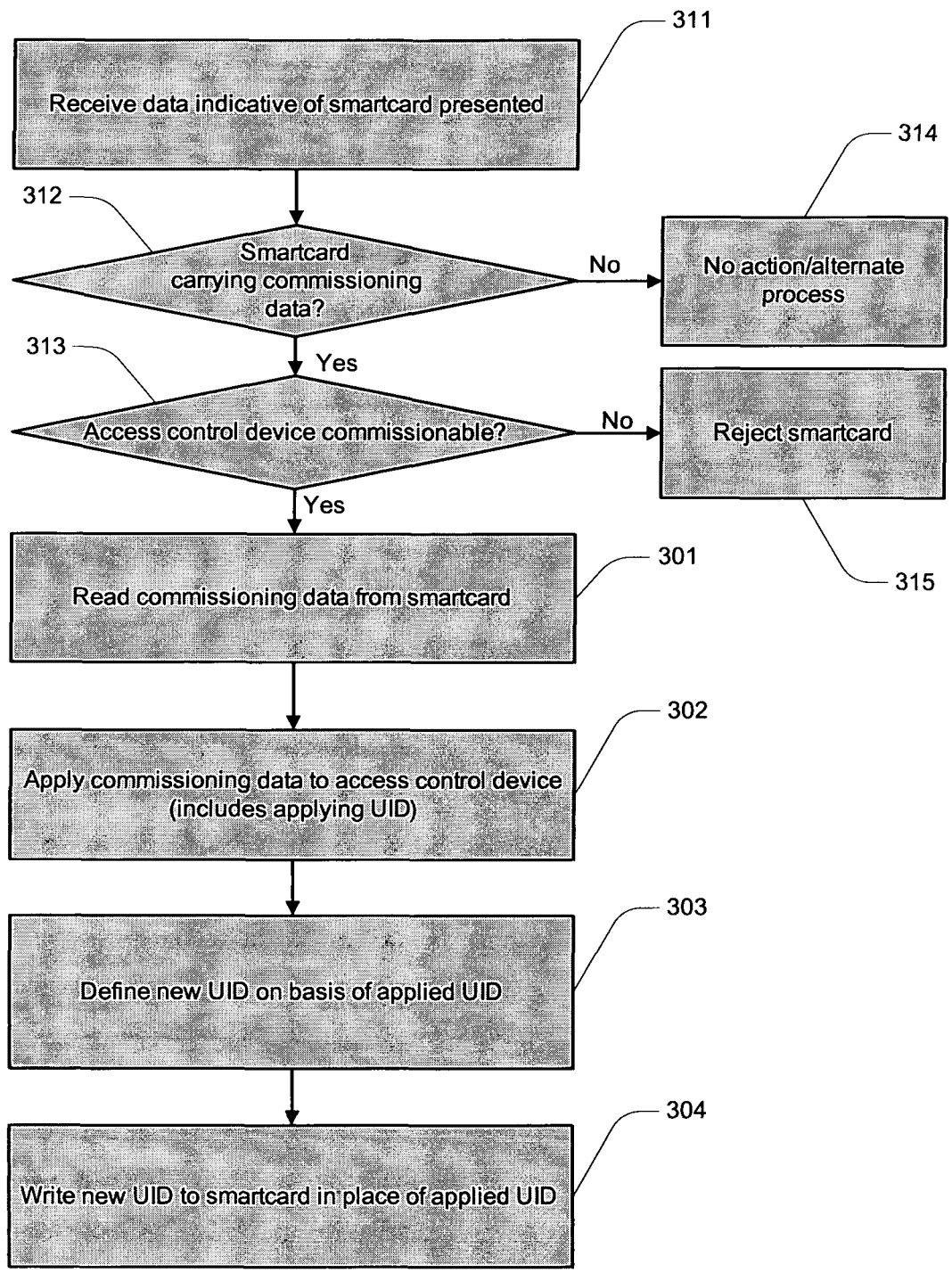
FIG. 3A schematically illustrates a method according to one embodiment.

FIG. 3A illustrates a method 310 according to one embodiment. Method 310 is again performable by device 201 upon the presentation of a smartcard, and includes steps 301 to 304 of method 300.

Step 311 includes receiving data indicative of a smartcard being presented to reader 210. Decision 312 includes determining whether this smartcard maintains commissioning data. In the event that the smartcard maintains commissioning data, the method progresses to decision 313. Otherwise the method progresses to step 314.

At decision 313 it is determined whether the device is commissionable. In the present embodiment, only an uncommissioned device is commissionable, and a device that has already been commissioned is not commissionable. This essentially prevents re-commissioning, which might be inadvertent or malicious. In the event that the device is commissionable, the method progresses to step 301. Otherwise the method progresses to step 315.

Step 314 includes either taking no action or optionally commencing an alternate process related to the content of the presented smartcard, which might include an alternate administrative process or an access control process.

Step 315 includes rejecting the commissioning smartcard, and optionally taking additional action (such as erasing data on the smartcard where predefined conditions are met, or raising an alarm).

In some embodiments, commissioning data includes network information, and this network information is applied to the access control device upon application of the commissioning data. For example, in some cases the network information includes an IP address, and step 303 includes applying that IP address to the access control device as a static IP address. An example along these lines is provided by method 320 of FIG. 3B, which again includes steps 301 to 304. In some embodiments the IP address is provided in combination with other network information such as a subnet mask, default gateway, and so on.

Figure 3B:
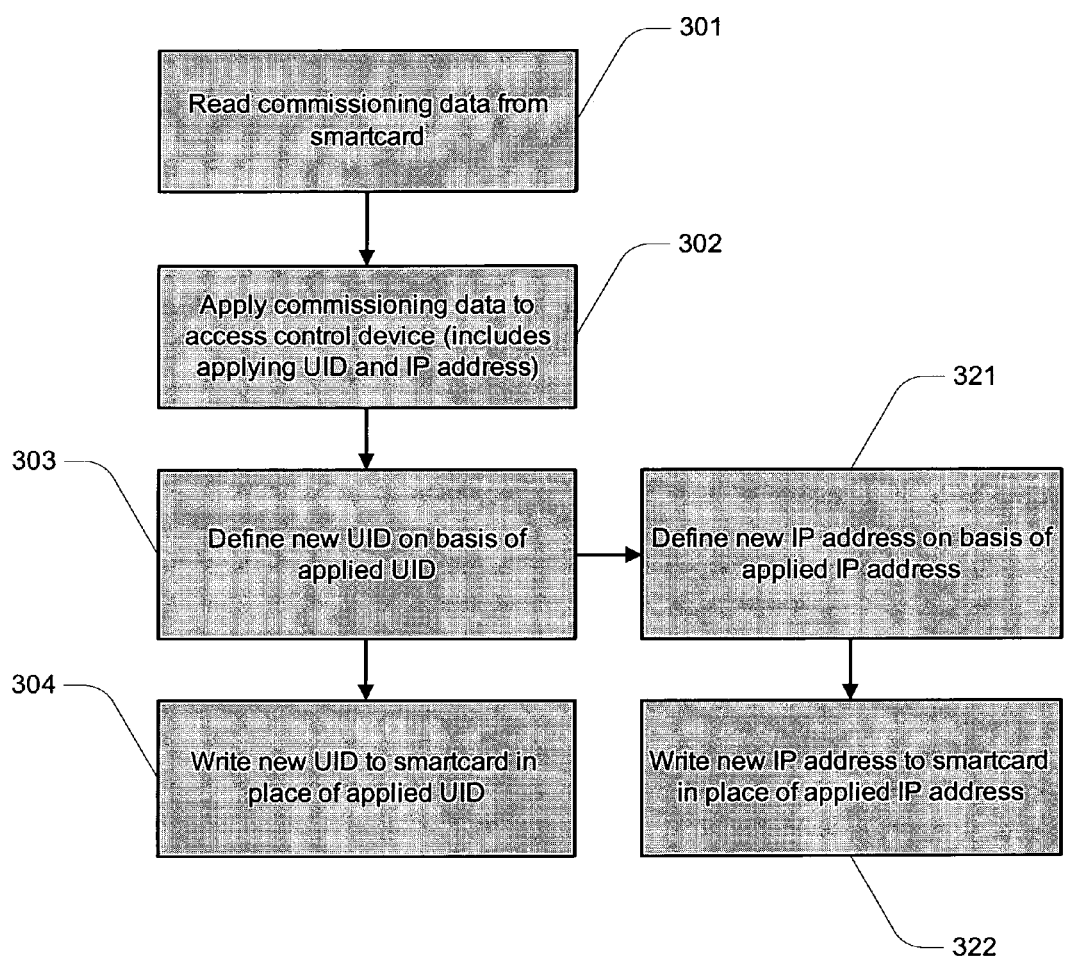
FIG. 3B schematically illustrates a method according to one embodiment.

Referring to FIG. 3B, step 321 includes defining a new IP address on the basis of the IP address applied at step 303. As with the UID, this is optionally performed based on incrementing the applied IP address, for example by increasing the numerical value of the final IP address block by one or another predefined amount. Step 322 includes writing the new IP address to the smartcard in place of the old IP address. It will be appreciated that each device commissioned using that smart card therefore applies a unique static IP address. It will be appreciated that this presents distinct advantages in light of known techniques for assigning unique static IP addresses to a large number of distributed access control devices which may or may not be at all times connected to a network.

In some embodiments certain predefined IP addresses or IP address types are selectively avoided, for example where it is know that those addresses are already allocated to other devices (particularly devices other than access control devices).

In some embodiments assign multiple IP address subnets are also assigned during the commissioning process.

In some embodiments an IP address is derived and applied on the basis of the applied UID and an IP address derivation protocol. Such a protocol is defined when creating a commissioning smartcard, and allows a user added flexibility to assign IP addresses having certain values or within certain ranges.

In other embodiments the UID and the static IP address are the same, or at least related to some degree such that one is derivable from the other.

In some embodiments where the access control devices connect to a network having a DHCP (Dynamic Host Configuration Protocol) server, dynamic IP addresses are assigned as an alternative to using static IP addresses.

In some embodiments measures are introduced to further manage risks associated with security, and to better ensure that all devices are uniquely commissioned. To this end, in some embodiments the commissioning data includes a legacy identifier. This legacy identifier is essentially indicative of whether or not one or more subsequent access control devices are to be commissioned by a given smartcard. In the case that no subsequent access control devices that are to be commissioned by that smartcard, steps 303 and 304 are omitted.

Figure 3C:
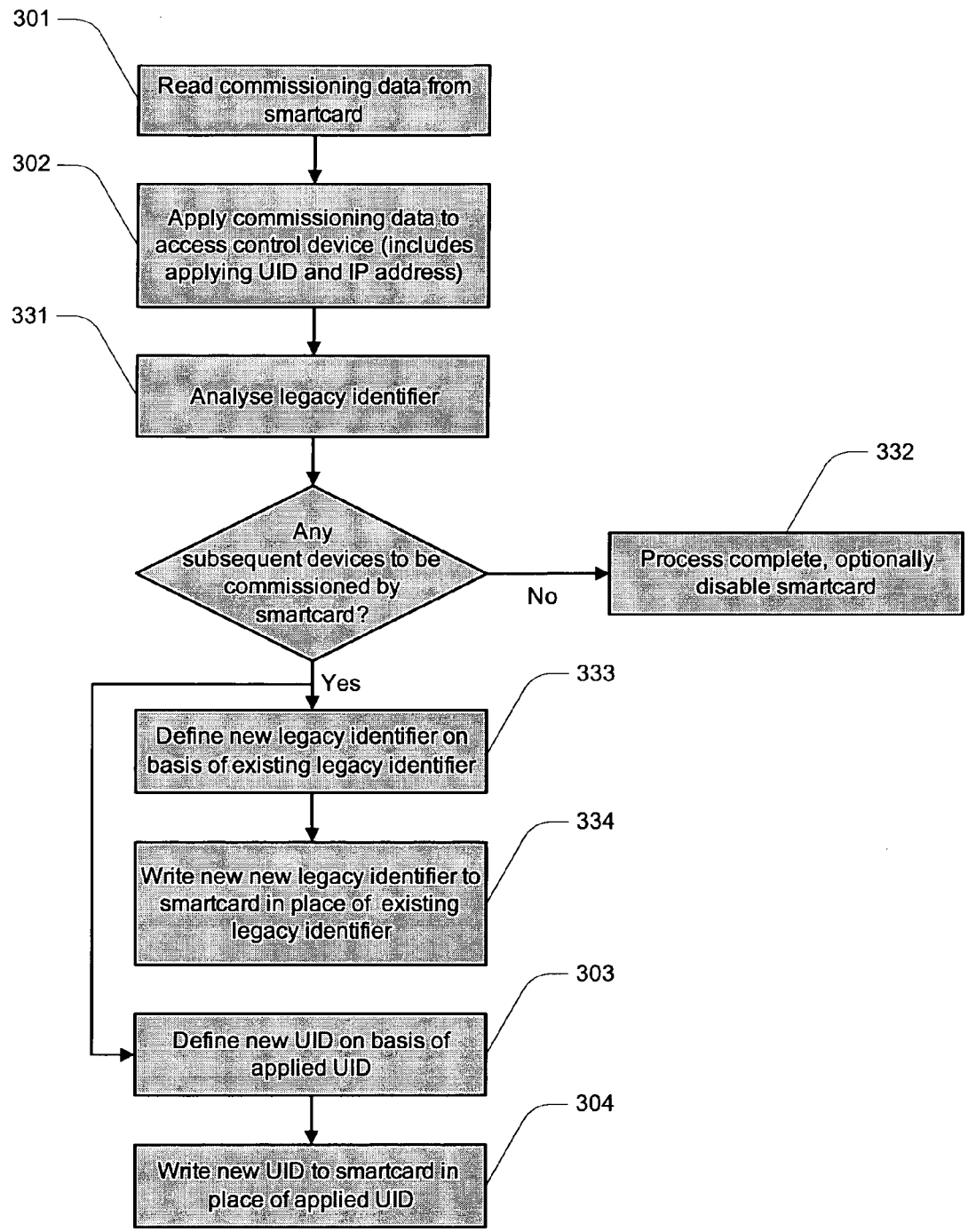
FIG. 3C schematically illustrates a method according to one embodiment.

FIG. 3C illustrates a method 330 where a legacy identifier is used. In this example, the legacy identifier is initially indicative of how many devices are to be commissioned by a given smartcard, and this number is downwardly incremented during the commissioning process at each device. At step 331 the legacy identifier is analyzed to determine whether there are any additional devices to be commissioned. In one embodiment this includes deciding whether the legacy identifier is non-zero. In the event that no further devices are to be commissioned, the method completes at 332. Otherwise, the method progresses to steps 303 and 333. At step 333 a new legacy identifier is defined (for example by downwardly incrementing the existing legacy identifier) and at step 334 the new legacy identifier is written to the smartcard.

Figure 4:
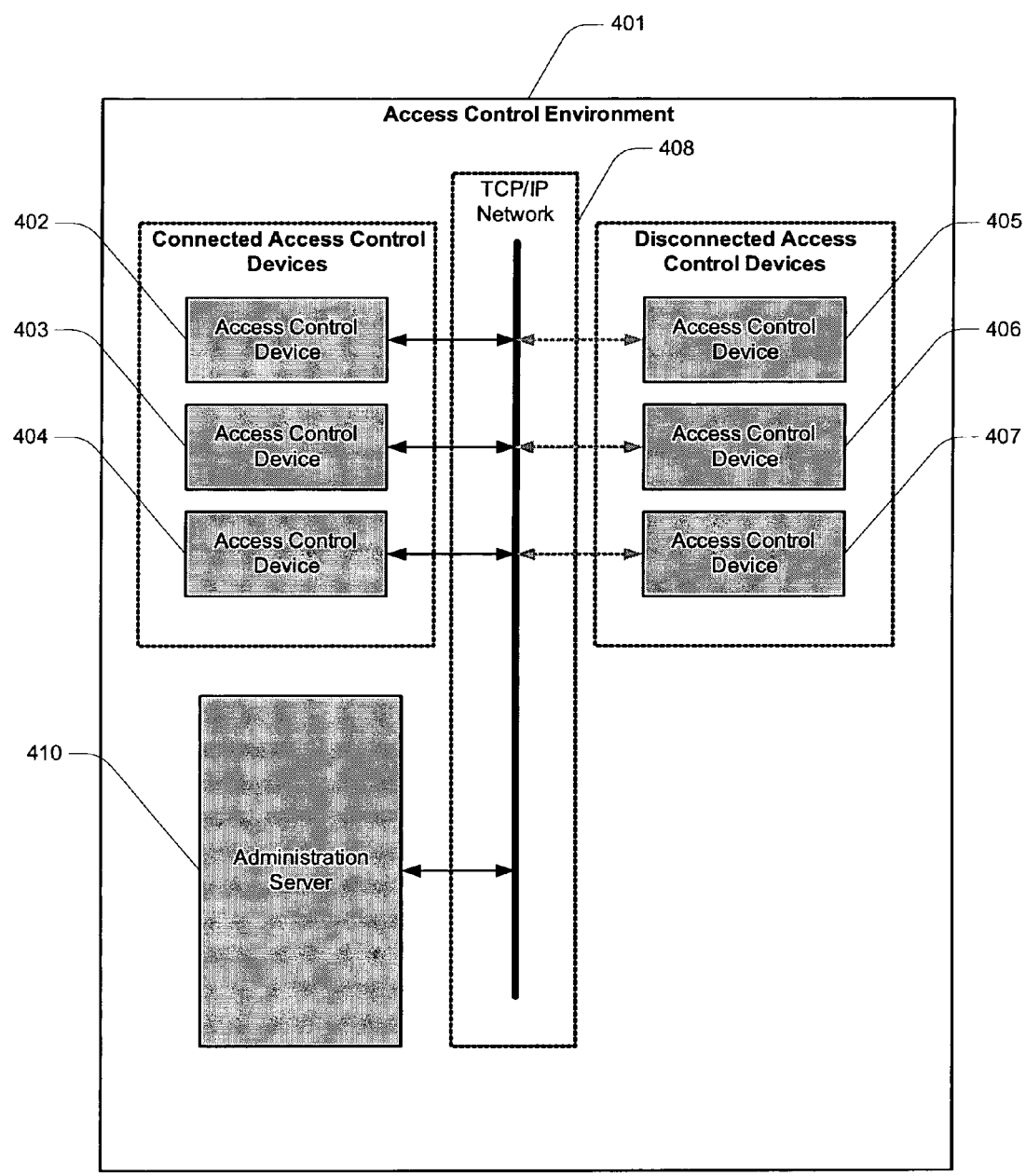
FIG. 4 schematically illustrates an access control environment according to one embodiment.

FIG. 4 illustrates an access control environment 401. Environment 401 includes connected access control devices 402 to 404 and disconnected access control devices 405 to 407. Connected access control devices are connected to a network 408, such as a TCP/IP network. An administration server 410 is also connected to network 408.

Figure 5:
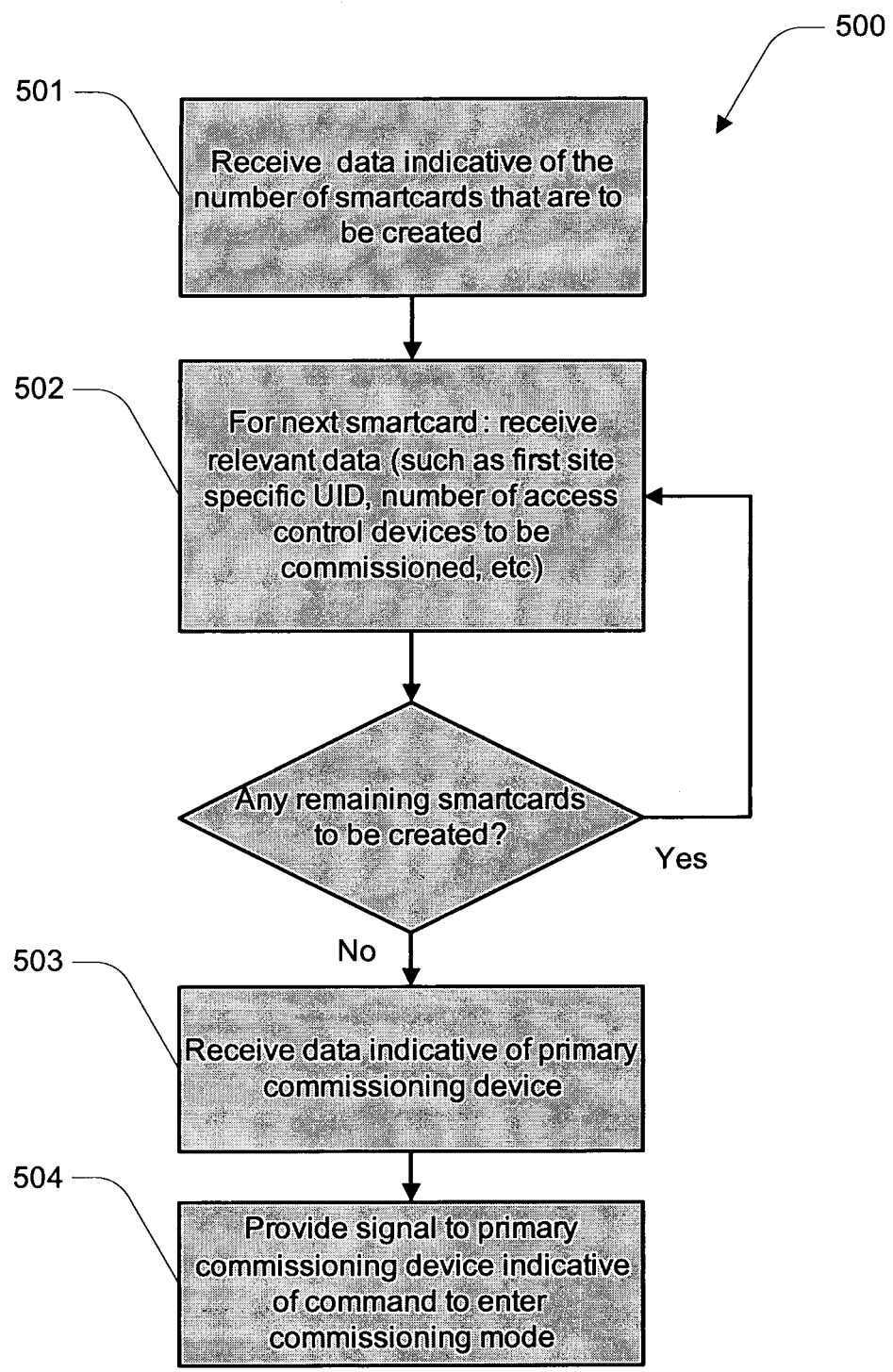
FIG. 5 schematically illustrates a method according to one embodiment.

In overview, administration server 410 performs various functionalities, including the creation of commissioning smartcards. FIG. 5 shows an exemplary method 500 performed by server 410, for example on the basis of software instructions executing on a processor of server 410. Step 501 includes receiving data indicative of the number of commissioning smartcards that are to be created. For example, in some embodiments it is preferable to use multiple commissioning smartcards in parallel to expedite the commissioning process. Step 502 includes, for each card, receiving data indicative of:

- The number of access control devices to be commissioned by that smartcard (this is optionally used to derive a legacy identifier).
- A site specific UID that is to be applied by the first access control device commissioned by that smartcard.
- An IP address that is to be applied by the first access control device commissioned by that smartcard. In some embodiments the data includes not only one IP address, but a valid range of IP addresses across one or multiple subnets
- Other network information, such as a subnet mask, default gateway and/or encryption keys.
- Security information, for example information that allows for secure communications between the device and other components on the network.
- Other commissioning information.

Step 502 is repeated for each smartcard that is to be created. In alternate embodiments additional or fewer aspects of data are received.

In some embodiments, the data received at step 502 is entered by a user via a software-based commissioning application running on server 410 or on a client terminal connected to network 408 and in communication with server 410. In one embodiment, the commissioning application runs within a web-browser application executing on a client terminal.

Step 503 includes receiving data indicative of a primary commissioning device. This is a user-designated connected access control device that will be responsible for initially writing commissioning data to the smartcard, and is device 402 in the present example. The data received at step 503 should be sufficient to allow unique identification of the primary commissioning device on the network, such as an IP address, MAC address, or factory set identifier. In some embodiments this data is provided in the same manner as the data received at step 502.

In some embodiments server 410 implements logic controls to ensure that, based on the number of commissioning smartcards to be created and the number of devices to be commissioned by each card, the same UID (or static IP address in relevant embodiments) is not applied to more than one device. For example, in one embodiment the server maintains data of the UIDs assignable by previously created smartcards, and prevents the creation of smartcards that would assign those UIDs.

At step 504, server 410 provides a signal to the primary commissioning device. This signal is indicative of a command to enter a commissioning mode, and in the present case also indicative of the commissioning data that is to be written to one or more smartcards by the primary commissioning device. In alternate embodiments the commissioning data is not stored at the primary commissioning device, and is instead obtained from sever 410 over network 408 as required (that is, subject to requests provided by device 402).

Figure 6:
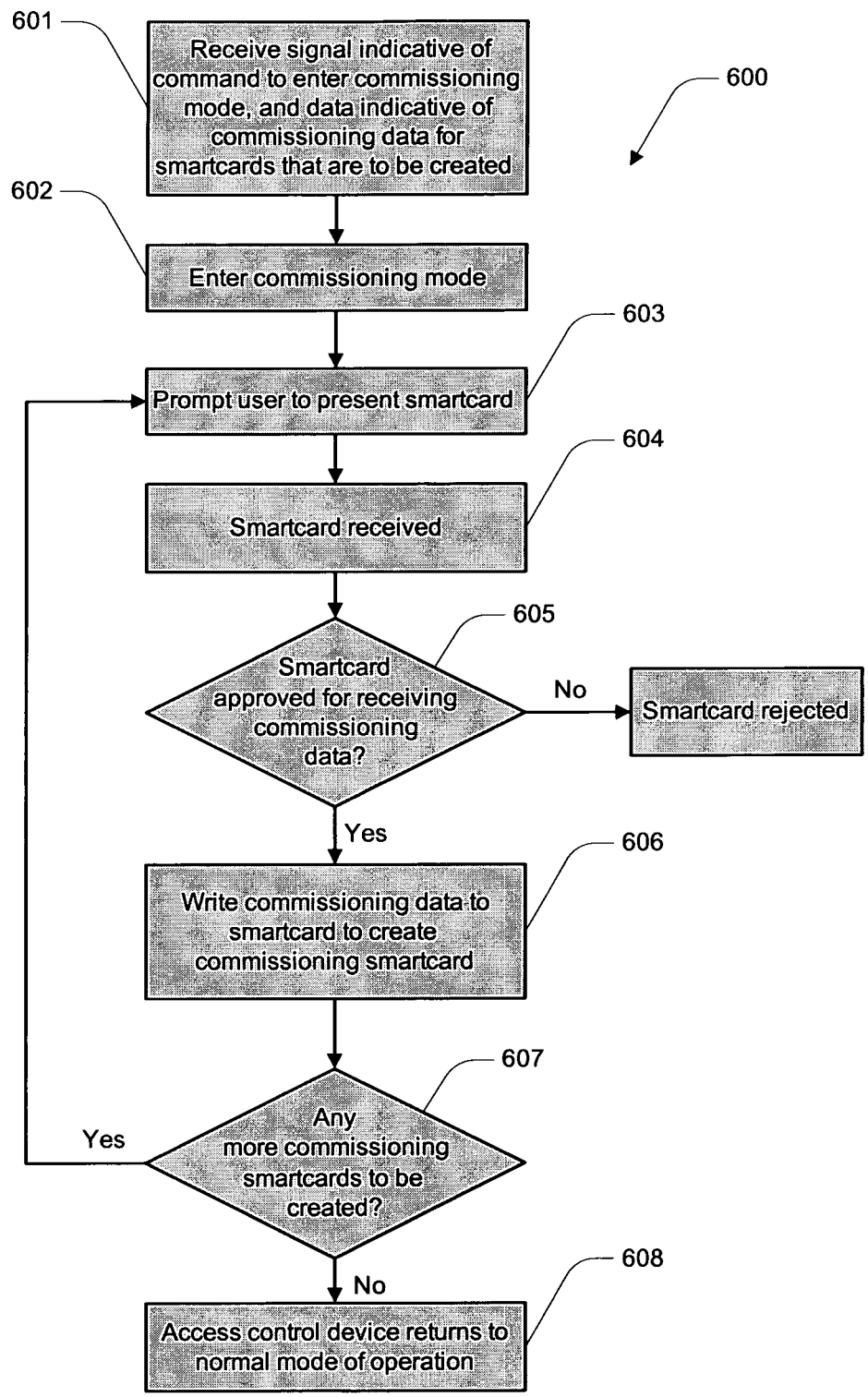
FIG. 6 schematically illustrates a method according to one embodiment.

FIG. 6 illustrates an exemplary method 600 performed by device 402 as the primary commissioning device. At step 601 the device receives a signal indicative of a command to enter a commissioning mode. At step 602 the device enters the commissioning mode. At step 603 the device prompts a user to present a smartcard for receiving commissioning data. A smartcard is received at step 604 and, subject to an approval at decision 605, commissioning data is written to that card at step 606 to create a commissioning smartcard. If, at decision 607, there are any more commissioning smartcards to be created, the method loops to step 603. Otherwise, the method completes at step 608 with the device returning to a normal mode of operation. A commissioning smartcard is then optionally presented to that access control device to commission the device, as in examples considered above. In some cases the primary commissioning device is commissioned after one or more other devices.

In alternate embodiments the primary commissioning device self-commissions whilst in the commissioning mode.

Although in the example considered above a primary commissioning device is used to create commissioning smartcards, in other embodiments these are created using another smartcard writing device coupled to server 410.

In some embodiments, upon being commissioned, an access control device provides status information for delivery to the administration server. In some cases this information is delivered via the network, and in other cases it is written to the smartcard for later delivery.

It will be appreciated that the presently described systems and methods present various advantages. These include, but are not limited to, the following:

Utility where access control devices are connected to a network that does not support broadcast messages.

Utility where one or more access control devices are not connected to a common network.

The ability to assign UIDs and unique static IP addresses to individual devices with minimal hassle.

The ability to know precisely what UID is applied to each physical device. The user knows this given that each device is physically visited for commissioning, and is made easier in embodiments where UIDs predictably increment between devices. This is particularly helpful where there is a desire to match the physical location devices with their electronic identifiers. It will be appreciated that this is difficult in cases where auto-discovery is used, and where the number of devices is large.

There is a low likelihood (or no likelihood) of two devices being non-uniquely commissioned.

It will be appreciated that the above disclosure provides various systems and methods for commissioning access control devices, these methods and systems providing distinct advantages and technical contributions over what was previously known in the art.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method performed by an access control device having a component configured to read data from a carrier substrate provided by a user and to grant the user access to a physical region or virtual functionality, the method including the steps of:
   (a) reading commissioning data from the carrier substrate, the commissioning data being applicable to a first access control device for commissioning the first access control device, the commissioning data including a first unique identifier which is applied to the first access control device upon application of the commission data;
   (b) applying the commissioning data to the first access control device thereby to commission the first access control device so that the first access control device operates in accordance with a wider access control environment;
   (c) defining a second unique identifier on the basis of the first unique device identifier;
   (d) writing the second unique identifier to the carrier substrate in place of the first unique identifier such that a subsequently commissioned second access control device commissioned by the carrier substrate applies the second unique identifier.

2. A method according to claim 1 wherein the carrier substrate is a smartcard.

3. A method according to claim 2 wherein the smartcard is readable in substantially the same manner as an access control card configured for use with the first access control device.

4. A method according to claim 1 wherein step (b) is only performed in the case that the first access control device is uncommissioned.

5. A method according to claim 4 wherein steps (c) and (d) are performed only in the case that step (b) is performed.

6. A method according to claim 1 wherein steps (a) to (d) are carried out by the first access control device.

7. A method according to claim 1 wherein step (c) includes incrementing the first unique identifier to define the second unique identifier.

8. A method according to claim 1 wherein the commissioning data includes a legacy identifier indicative of whether or not one or more subsequent access control devices are to be commissioned by the carrier substrate.

9. A method according to claim 8 wherein the legacy identifier is indicative of a number of subsequent devices access control devices that are to be commissioned by the carrier substrate.

10. A method according to claim 8 including the step of being responsive to the legacy identifier for, in the case that no subsequent access control devices are to be commissioned by the carrier substrate, omitting at least step (d).

11. A method according to claim 1 wherein the commissioning data includes network information which is applied to the first access control device upon application of the commissioning data.

12. A method according to claim 11 wherein the network information includes a first IP address, and step (b) includes applying the first IP address to the first access control device.

13. A method according to claim 12 including the steps of:
   (e) defining a second unique IP address on the basis of the first IP address;
   (f) writing the second IP address to the carrier substrate in place of the first IP address such that the subsequently commissioned second access control device applies the second IP address.

14. A method according to claim 11 wherein the network information includes constraints for the definition of an IP address.

15. A method according to claim 1 including a step of, on the basis of the applied UID and an IP address derivation protocol, deriving and applying an IP address.

16. A method according to claim 13 wherein step (e) includes incrementing the first IP address to define the second IP address.

17. A method according to claim 1 wherein the commissioning data includes default configuration data for the first access control device.

18. A method according to claim 17 wherein the default configuration data includes data that is constant across all access control devices in the wider access control environment.

19. A controller for a first access control device, the controller including:
an input for reading commissioning data from a carrier substrate, the commissioning data being applicable to the first access control device for commissioning the first access control device, the commissioning data including a first unique identifier which is applied to the first access control device upon application of the commission data;
a processor for:
(i) applying the commissioning data to the first access control device thereby to commission the first access control device;
(ii) defining a second unique identifier on the basis of the first unique device identifier;
an output for writing the second unique identifier to the carrier substrate in place of the first unique identifier such that a subsequently commissioned second access control device commissioned by the carrier substrate applies the second unique identifier.

20. An access control device including:
an input for reading commissioning data from a carrier substrate, the commissioning data being applicable to the first access control device for commissioning the first access control device, the commissioning data including a first unique identifier which is applied to the first access control device upon application of the commission data;
a processor for:
(i) applying the commissioning data to the first access control device thereby to commission the first access control device;
(ii) defining a second unique identifier on the basis of the first unique device identifier;
an output for writing the second unique identifier to the carrier substrate in place of the first unique identifier such that a subsequently commissioned second access control device commissioned by the carrier substrate applies the second unique identifier.

* * * * *